(12) United States Patent
Gao et al.

(10) Patent No.: US 8,929,016 B2
(45) Date of Patent: Jan. 6, 2015

(54) HEATER ASSEMBLY AND METHOD OF HEATING

(71) Applicant: Seagate Technology LLC, Cupertino, CA (US)

(72) Inventors: Kaizhong Gao, Shoreview, MN (US); Raul Horacio Andruet, Woodbury, MN (US); Xiaobin Wang, Chanhassen, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/831,206

(22) Filed: Mar. 14, 2013

(65) Prior Publication Data

US 2013/0286807 A1 Oct. 31, 2013

Related U.S. Application Data

(60) Provisional application No. 61/638,994, filed on Apr. 26, 2012.

(51) Int. Cl.
| | |
|---|---|
| *G11B 5/02* | (2006.01) |
| *G11B 13/08* | (2006.01) |
| *G11B 5/31* | (2006.01) |
| *G11B 5/60* | (2006.01) |
| *G11B 5/00* | (2006.01) |

(52) U.S. Cl.
CPC ............. *G11B 13/08* (2013.01); *G11B 5/3133* (2013.01); *G11B 5/314* (2013.01); *G11B 5/607* (2013.01); *G11B 2005/0021* (2013.01)
USPC .......... 360/59; 360/75; 360/234.4; 360/294.7; 369/13.13; 369/13.33; 369/13.34

(58) Field of Classification Search
None
See application file for complete search history.

(56) References Cited

U.S. PATENT DOCUMENTS

| | | | |
|---|---|---|---|
| 7,990,647 | B2 | 8/2011 | Lille |
| 8,164,987 | B2 | 4/2012 | Gill et al. |
| 8,254,061 | B2 | 8/2012 | Kuroki et al. |
| 8,259,412 | B2 | 9/2012 | Hsiao et al. |
| 2010/0118442 | A1* | 5/2010 | Kuroki et al. ............ 360/234.3 |
| 2011/0080671 | A1 | 4/2011 | Atsumi et al. |
| 2011/0149430 | A1* | 6/2011 | Shiramatsu et al. ........... 360/75 |
| 2012/0099218 | A1 | 4/2012 | Kurita et al. |
| 2012/0201108 | A1* | 8/2012 | Zheng et al. .............. 369/13.26 |

OTHER PUBLICATIONS

Miyake et al., "Optimized Design of Heaters for Flying Height Adjustment to Preserve Performance and Reliability", IEEE Transactions on Magnetics, vol. 43, No. 6, Jun. 2007, pp. 2235-2237.

* cited by examiner

*Primary Examiner* — Wayne Young
*Assistant Examiner* — Brian Butcher
(74) *Attorney, Agent, or Firm* — Hollingsworth Davis, LLC

(57) ABSTRACT

A magnetic recording head includes a magnetic writer comprising a main write pole and a return write pole. The magnetic recording head includes a write heater assembly comprising at least one first heater subassembly and at least one second heater subassembly. At least part of the magnetic write head is disposed between the first heater subassembly and the second heater subassembly. When the first heater subassembly, the second heater subassembly, and the magnetic writer are energized, a variation in the thermal protrusion of the head media interface of the magnetic recording head may be less than about 20 nm along the down track and/or cross track directions.

19 Claims, 12 Drawing Sheets

HEATER ASSEMBLY AND METHOD OF HEATING

RELATED PATENT DOCUMENTS

This application claims the benefit of provisional Patent Application Ser. No. 61/638,994 filed on Apr. 26, 2012, to which priority is claimed pursuant to 35 U.S.C. §119(e) and which is hereby incorporated herein by reference in its entirety.

SUMMARY

Embodiments of the disclosure are directed approaches for providing thermal protrusion for a magnetic recording head. Some embodiments involve a magnetic recording head that includes a magnetic writer comprising a main write pole and a return write pole. The magnetic recording head includes a write heater assembly comprising at least one first heater subassembly and at least one second heater subassembly. At least part of the magnetic write head is disposed between the first heater subassembly and the second heater subassembly. For example, when the first heater subassembly, the second heater subassembly, and the magnetic writer are energized, a variation in the thermal protrusion stroke of head media interface of the magnetic recording head may be less than about 20 nm, less than about 18 nm, less than about 15 nm or even less than about 10 nm along the down track and/or cross track directions.

Some embodiments involve a method of providing a thermal protrusion of a magnetic recording head. At least a first heater subassembly and a second heater subassembly of a magnetic recording head are energized. The energizing of the first heater subassembly creates a first thermal protrusion at a first location of a head-media interface of the magnetic recording head. The energizing of the second heater subassembly creates a second protrusion at a second location of the head media interface of the magnetic recording head. A write head of the magnetic recording head is energized. The energizing of the write head creates a write head thermal protrusion at the head media interface of the magnetic recording head. A location of the write head thermal protrusion is between the first location and the second location. For example, energizing the write head comprises energizing a magnetic write pole of the magnetic recording head and/or energizing a near field transducer of the write head.

These and other features and aspects of various embodiments may be understood in view of the following detailed discussion and accompanying drawings.

DETAILED DESCRIPTION

Data storage systems commonly include one or more magnetic recording heads that write and read information to and from a recording medium. It is often desirable to have a relatively small distance or spacing between a recording head and its associated media. This distance or spacing is known as "fly height" or "head-media spacing." By reducing the head-media spacing, a magnetic recording head is typically better able to both write and read data to and from a medium. Reducing the head-media spacing also allows for surveying of recording medium topography, such as for detecting asperities and other features of the recording medium surface. Head-media contact detection and/or head-media spacing sensing technologies are important for the performance and reliability of magnetic storage systems. Higher contact detection repeatability enables lower active clearance, and thus higher recording density. Higher contact detection sensitivity reduces wear and improves reliability.

To establish head-media separation in a storage system, head-media contact is detected. Head-media contact detection and/or head-media separation sensing technologies are critical for the performance and reliability of hard disk drives. Higher contact detection repeatability enables lower active clearance, and thus higher recording density. Higher contact detection sensitivity reduces wear and improves reliability.

One approach for detecting contact involves evaluating a temperature profile for a recording head transducer before, during, and after contact between the head transducer and a surface of a magnetic recording medium. When the head transducer is actuated by a thermal actuator, the head transducer surface temperature will increase with the actuation due to the heat generated by the thermal actuator. The head transducer temperature will then be higher than the temperature of the medium. As such, the medium acts as a heat sink.

When the head transducer contacts the medium, the head transducer surface temperature drops due to a change in heat transfer rate resulting from the contact. The head transducer surface temperature then continues to increase due to the continued thermal actuator heating as well as the added frictional heating. The change in temperature or excursion in temperature trajectory can be used to declare head-media contact. Details concerning head-media separation and contact determinations in accordance with various embodiments of the disclosure are provided in commonly owned U.S. Pat. No. 8,523,312 which is incorporated herein by reference.

Figure 1:
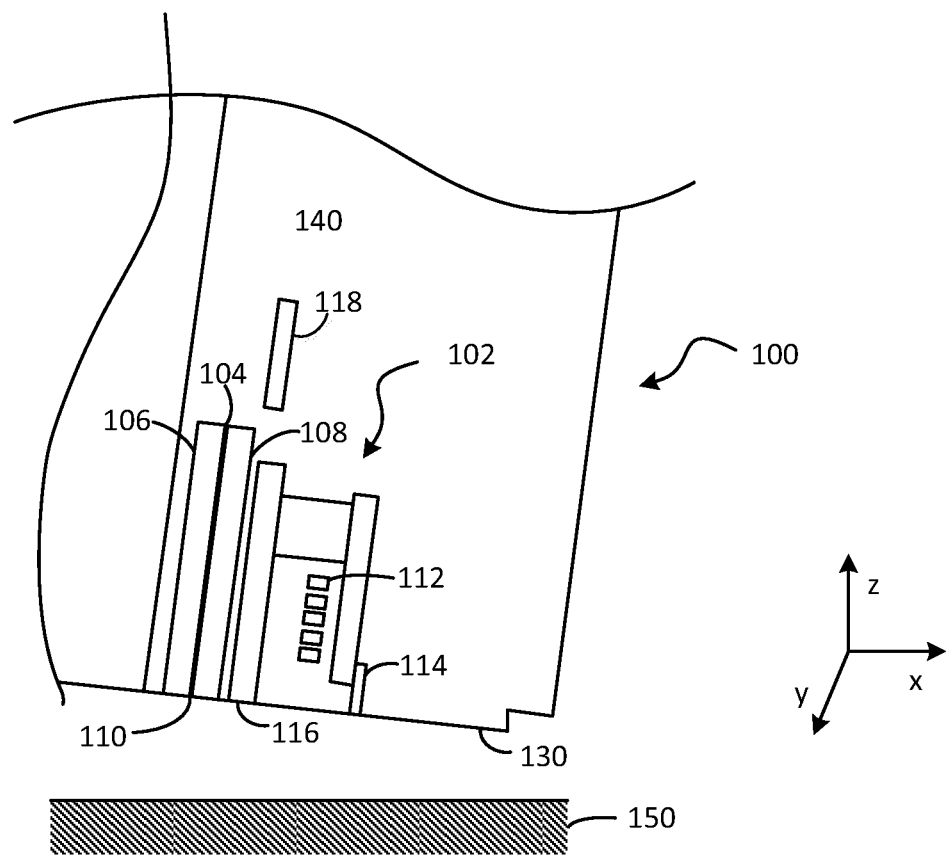
FIGS. 1 and 2A are schematic cross-sections of a magnetic recording head, in accordance with various embodiments.

A magnetic recording head arrangement 100 for detecting head-media contact in accordance with various embodiments is illustrated in FIG. 1. The magnetic recording head arrangement 100 is located on a slider positioned proximate a rotating magnetic medium 150. The magnetic medium 150 is configurable for reading and/or writing data with magnetic recording head arrangement 100. The surface of magnetic recording head arrangement 100 facing magnetic medium 150 includes a head media interface (HMI) 130 (also referred to as an air bearing surface (ABS)).

The magnetic recording head 100 includes a magnetic read head 104 proximate the HMI 130 for reading data from the magnetic medium 150. Proximate the magnetic read head 104 are shields 106, 108 and an optional thermal sensor 110. Optional thermal sensor 110 can be any variety of sensor including a sensor having a temperature coefficient of resistance (TCR), a varistor, or a thermocouple, for example. One example of a TCR sensor is a dual-ended temperature coefficient of resistance sensor (DETCR). A TCR sensor measures temperature change by measuring the change in resistance, or rate of change in resistance, across the sensor. The thermal sensor 110 measures the temperature change at HMI 130 induced by all thermal condition changes from air pressure, clearance, head operation, and contact, among other changes. The location of the optional thermal sensor shown in FIG. 1 represents one possible location for the thermal sensor.

The magnetic recording head 100 also includes magnetic write head 102 proximate the HMI 130 for writing data to the magnetic medium 150. The magnetic write head 102 includes a write coil 112, a main write pole 114, and a write return pole 116. Write heater assembly 118 can be positioned near one of the write poles or between the write poles. Write heater assembly 118 includes at least one first heater subassembly and at least one second heater subassembly.

In some embodiments, magnetic write head 102 is configured for heat assisted magnetic recording (HAMR) by including a laser arrangement. The laser arrangement includes a light source (e.g., laser diode) that energizes an optical antenna of a near-field transducer (NFT) via a waveguide proximate the HMI 130 and main write pole 114. The light source can be mounted external, or integral, to the magnetic recording head 100. When the magnetic write head 102 includes a NFT, the NFT and/or at least a part of the write head is disposed between the first and second heater subassemblies.

As described herein, in various configurations, the first and second heater subassemblies straddle at least part of the magnetic write head 102 and/or the NFT, if present. For example, the write heater assembly can be positioned proximate to the write return pole 116 and/or may be disposed between the return pole and the main write pole and/or between the return pole and the waveguide and NFT. In these locations, the first and second subassemblies may be disposed on either side of the NFT, for example.

The first and second heater subassemblies can be oriented along different planes of the magnetic recording head 100. This can be described using a frame of reference having a down track x axis and an orthogonal cross track y axis, where "down track" refers to the direction of rotation for magnetic medium 150. In FIG. 1, the subassemblies of heater assembly 118 are positioned in a cross track orientation. The first heater subassembly is disposed at a first position along the y axis and the second heater subassembly is disposed at a second position along the y axis, different from the first position. The cross-sectional view of FIG. 1 coupled with the cross track orientation of the heater subassemblies results in only one heater element being shown.

Thermal actuation of heating elements in magnetic recording head 100 cause protrusion of the magnetic recording head 100 materials, more specifically, thermal actuation causes protrusion of HMI 130 toward magnetic medium 150 in a protrusion region of the magnetic recording head 100. The protrusion region can be considered a region of HMI 130 extending outwardly from a location of maximum protrusion to locations that expand by at least a predetermined percentage of maximum HMI protrusion. In various embodiments, the protrusion region may be defined by a region of HMI 803 that protrudes at least 70%, or at least 80%, or at least 90% or at least 95% relative to a region of maximum protrusion of HMI 130.

To describe this protrusion, the frame of reference set forth above can also include a z axis normal to the head media interface. When energized, the first heater subassembly is configured to cause a first thermal protrusion at a first protrusion location, $L_{PY1}$, along the y axis having a first maximum protrusion displacement (also referred to as "stroke"), $S_{Max1}$, measured along the z axis at $L_{PY1}$, where protrusion stroke is a measurement of the extent of thermal displacement from a default state/position of the HMI when the magnetic recording head is not thermally actuated. Likewise, the second heater subassembly is configured to cause a second thermal protrusion when energized, having a second maximum displacement, $S_{Max2}$, measured along the z axis and occurring at a second protrusion location, $L_{PY2}$, along the y axis. The first and second thermal protrusion locations, $L_{PY1}$ and $L_{PY2}$ being different locations along the y axis.

In addition, the magnetic write head 102 causes a write head thermal protrusion due to activation of the magnetic write pole and/or NFT at a protrusion location, $L_{PYW}$, along the y axis, where the write head thermal protrusion has a maximum protrusion displacement, $S_{MW}$, measured from along the z axis at $L_{PYW}$. The write head thermal protrusion location $L_{PYW}$ is located between $L_{PY1}$ and $L_{PY2}$ along the y axis. When thermally actuated, the overall protrusion in the protrusion region of the magnetic recording head 100 is a superposition of the first thermal protrusion, the second thermal protrusion, and the write head thermal protrusion. For example, the protrusion displacement of the magnetic recording head varies less than about 20 nm, or less than about 18 nm, or even less than about 15 nm in the protrusion region. In some embodiments, the protrusion displacement of the magnetic recording head varies less than about 20 nm, or less than about 18 nm, or even less than about 15 nm between $L_{PY1}$ and $L_{PY2}$ along the y axis.

While heater subassemblies are described herein as creating thermal protrusion at the head-media interface, any means for creating thermal protrusion may be implemented. The heating elements can be resistive heating elements, laser arrangements, or any other thermal actuating arrangement to induce thermal protrusion.

Figure 2A:
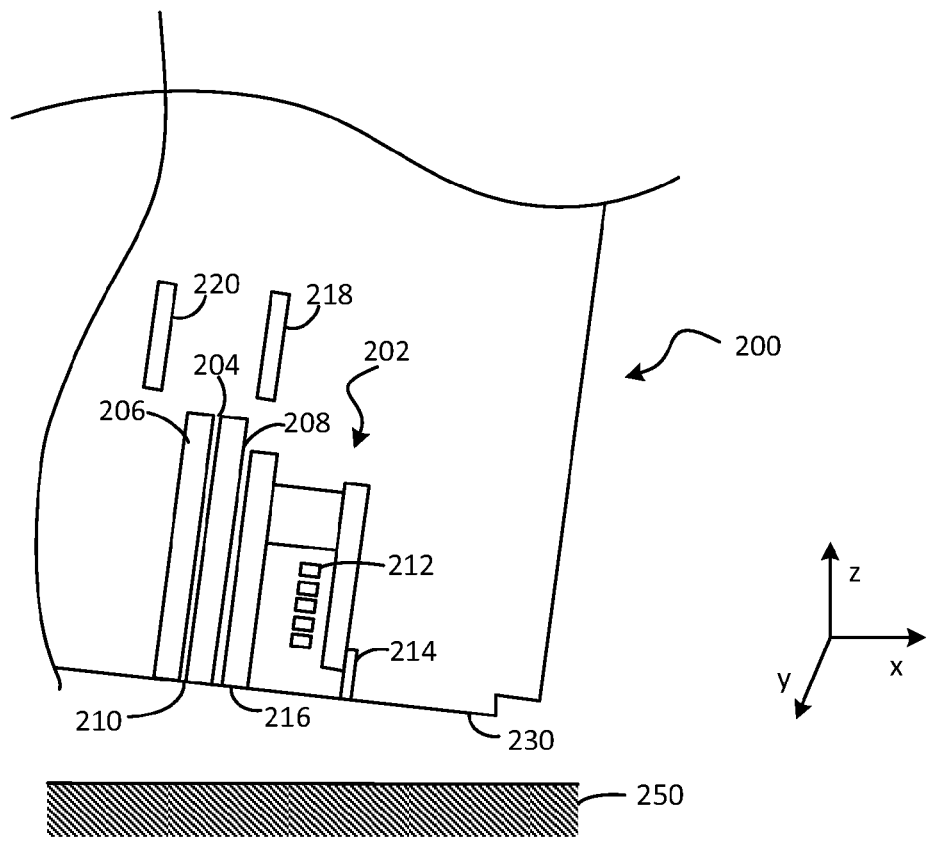

Additionally or alternatively, the heater subassemblies can be positioned in a down track orientation (along the x-axis), as illustrated in FIG. 2A. Here a magnetic recording head arrangement 200 is located on a slider positioned proximate a rotating magnetic medium 250. The magnetic medium 250 is configurable for reading and/or writing data with magnetic recording head arrangement 200. The surface of magnetic recording head arrangement 200 facing magnetic medium 250 includes an HMI 230.

The magnetic recording head 200 includes a magnetic read head 204 proximate the HMI 230 for reading data from the magnetic medium 250. Proximate the magnetic read head 204 are shields 206, 208 and an optional thermal sensor 210. As discussed above, thermal sensor 110 can be any variety of sensor including a resistive sensor that measures the temperature change at HMI 230 induced by all thermal condition changes from air pressure, clearance, head operation, and contact, among other changes.

The magnetic recording head 200 also includes magnetic write head 202 proximate the HMI 230 for writing data to the magnetic medium 250. The magnetic write head 202 includes a write coil 212, a main write pole 214, and a write return pole 216. Proximate the magnetic write head 202 is a write heater assembly including at least one first heater subassembly 218 and at least one second heater subassembly 220 arranged along the down track axis. Heater subassembly 218 may also include multiple subassemblies and heater subassembly may also include multiple subassemblies that are not visible in the cross section shown in FIG. 2B. At least part of the magnetic write head 202 can be disposed between the first and second heater subassemblies 218, 220. In alternative embodiments, magnetic write head 202 is configured for heat assisted magnetic recording (HAMR) where the magnetic write head 202 includes a NFT and the NFT is disposed between the first and second heater subassemblies 218, 220.

Heater subassemblies 218, 220 are positioned in a down track orientation. This can be described using the same frame of reference as above with a down track x axis and an orthogonal cross track y axis. The first heater subassembly is disposed at a first position along the x axis and the second heater subassembly is disposed at a second position along the x axis, different from the first position. The cross-sectional view of FIG. 2A coupled with the down track orientation of the heater subassemblies results in both heater subassemblies 218, 220 being shown. When energized, the heater subassemblies 218, 220 and the write head 202 cause a thermal protrusion of the HMI 230 in a protrusion region.

When energized, the first heater subassembly is configured to cause a first thermal protrusion having a first maximum stroke, $S_{Max1}$, along the z axis, where the z axis is again normal to the head media interface, e.g. orthogonal to the x and y axes. The first maximum stroke, $S_{Max1}$, occurs at a first protrusion location, $L_{PX1}$, along the x axis. Likewise, the second heater subassembly is configured to cause a second thermal protrusion having a second maximum stroke, $S_{Max2}$, along the z axis measured at a second protrusion location, $L_{PX2}$, along the x axis. The first and second thermal protrusion locations $L_{PX1}$ and $L_{PX2}$ being different locations along the x axis.

In addition, the magnetic write head 202 (magnetic write pole and/or NFT) causes a write head thermal protrusion at a protrusion location, $L_{PXW}$, along the x axis, where the write head thermal protrusion has a maximum protrusion stroke, $S_{MW}$, measured from along the z axis at $L_{PXW}$. The write head thermal protrusion location $L_{PXW}$ is located between $L_{PX1}$ and $L_{PX2}$ along the x axis. When thermally actuated, a protrusion of the magnetic recording head 100 is a superposition of the first thermal protrusion, the second thermal protrusion, and the write head thermal protrusion. For example, the protrusion of the magnetic recording head varies less than about 20 nm, or less than about 18 nm, or even less than about 15 nm in the protrusion region. In some embodiments, the protrusion of the magnetic recording head varies less than about 20 nm, or less than about 18 nm, or even less than about 15 nm between $L_{PX1}$ and $L_{PX2}$ along the x axis.

Figure 2B:
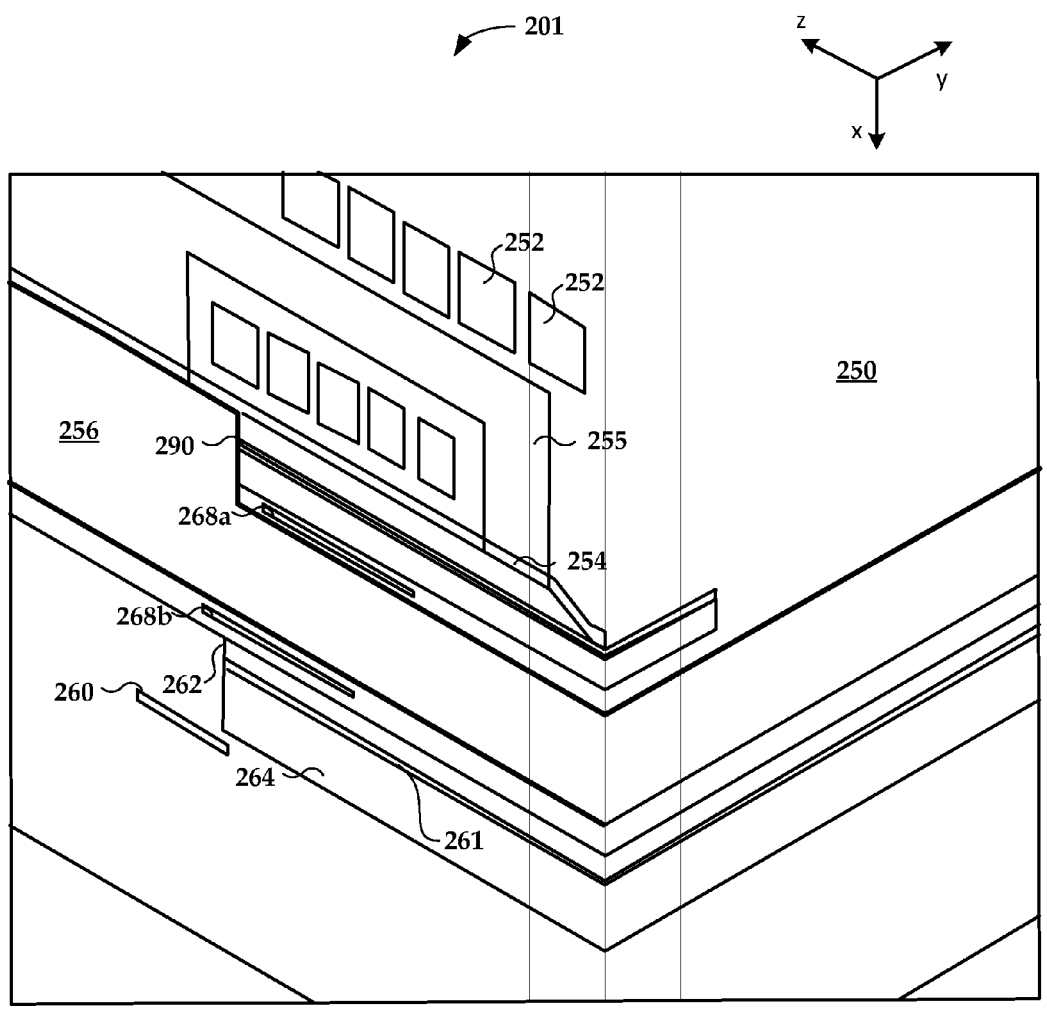
FIG. 2B is a sectional view of a magnetic recording head in accordance with various embodiments.

FIG. 2B illustrates a sectional view of a HAMR head in accordance with some embodiments. The magnetic recording head 201 includes a magnetic write transducer comprising a main write pole 254 and a return pole 256. Coils 252 are disposed around yoke 255. In this embodiment, the magnetic writer includes waveguide 290 configured to couple laser light into an NFT optical antenna (not shown in FIG. 2B). FIG. 2B shows two possible locations for a writer heater assembly. A writer heater assembly (shown at location 268a) may be disposed between the write return pole 256 and the main write pole 254 The writer heater assembly may be disposed between the return write pole 256 and the waveguide 290. In some embodiments, the writer heater assembly (shown at location 268b) is disposed between the write return pole 256 and the read sensor 261. The HAMR head includes a reader 261 disposed between reader shields 262, 264. A reader heater is disposed proximate to the reader shield 264. The writer heater 268 and/or the reader heater 260 may include multiple heater subassemblies disposed along the cross track (y) direction.

Head-media contact may be initiated by intentional protrusion of the a head media interface (HMI) of the magnetic recording head into the air gap between the magnetic recording head and media in response to thermal actuation of the heater subassemblies and/or magnetic writer. In a HAMR configuration, the magnetic recording head can be subjected to at least three sources of heat. One heat source is the write coil when actuated. The amount of heat generated by the write coil is relatively fixed. A second source involves a heating assembly associated with respective write head and read head circuitry, which can be selectively activated to intentionally protrude the head media interface. The heating assemblies and subassemblies can be configured and/or controlled to vary the total amount of heat actuating the magnetic recording head and, therefore, the magnitude of read head and/or write head protrusion. A third source is the NFT corresponding to the HAMR heat source, e.g., a laser. The NFT transforms laser energy to thermal energy in order to heat a spot on the magnetic medium during write operations. The heat generated by the NFT during write operations is also relatively fixed. Differing combinations of heating element actuation results in different protrusion profiles.

Figure 3A:
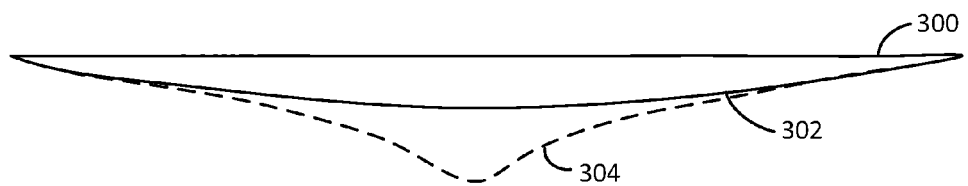
FIG. 3A shows protrusion of a head media interface (HMI) for a heater-actuated magnetic recording head with and without actuation of a near-field transducer.

In FIG. 3A, three protrusion profiles are illustrated for a media facing surface of a magnetic head with a single heater assembly. Surface 300 represents a head media interface of a magnetic recording head in a default state where no thermal actuation is present. When a heating element, having a single heater subassembly, and/or write coil is actuated, example protrusion profile 302 results. A large, gradual protrusion is seen in profile 302. When an NFT is actuated in addition to the heating element and/or write coil, protrusion profile 304 results. The single assembly heating element is largely co-located with other heating elements (e.g., write coil, NFT) such that the maximum region of protrusion corresponds to the area of co-location. In profile 304, additional protrusion is induced with a narrower profile resulting in a smaller area of head-media contact. This protrusion is subject to faster degradation as the magnetic recording head is in contact with media during operation modes.

Figure 3B:
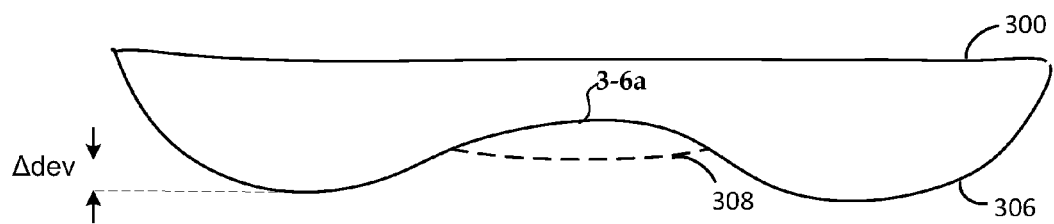
FIG. 3B shows protrusion of a head media interface (HMI) for a heater-actuated magnetic recording head with and without actuation of a near-field transducer, in accordance with various embodiments.

FIG. 3B illustrates protrusion profiles for a media facing surface of a head with two heater subassemblies, in accordance with various embodiments. When two (or more) heater subassemblies are used, both (or at least two) of the heater subassemblies are concurrently active. Again, surface 300 represents a head media interface of a magnetic recording head in a default state where no thermal actuation is present. When the heating subassemblies and/or write coil are actuated, example protrusion profile 306 results. The areas of increased protrusion/stroke correspond to the heater subassembly locations. The portion of the head media interface corresponding to the location of the write element exhibits a relative recess 306a in the profile 306. When an NFT is actuated in addition to the heating element and/or write coil, protrusion profile 308 results. Again, the NFT induces additional protrusion and a close point (an area of maximum protrusion of the head media interface) corresponding to the location of the NFT.

The protrusion profile of the HMI is a superposition of the protrusions caused by the heater subassemblies, the write pole, and the NFT. Due to the arrangement of the heater subassemblies one either side of the NFT, the relative protrusion attributable to the NFT is much less than in FIG. 3A. The use of two heater subassemblies disposed on other side of the NFT and/or portion of the writer produces a flatter thermal protrusion profile across the HMI than the protrusion profile shown in FIG. 3A which includes one heater subassembly. For example, for the embodiment illustrated in FIG. 3B, the deviation (Δdev) in the protrusion profile in the protrusion region, e.g., between the location of the first heater subassembly and the location of the second heater subassembly may be less than about 20 nm, or less than about 18 nm, or even less than about 15 nm. The flatter protrusion attributable to the heater subassemblies increases the contact area to improve reading and writing to the media and magnetic recording head reliability. While the protrusion profiles of FIGS. 3A-B are illustrated two-dimensionally, it should be appreciated that the head media interface extends three-dimensionally.

Figure 4:
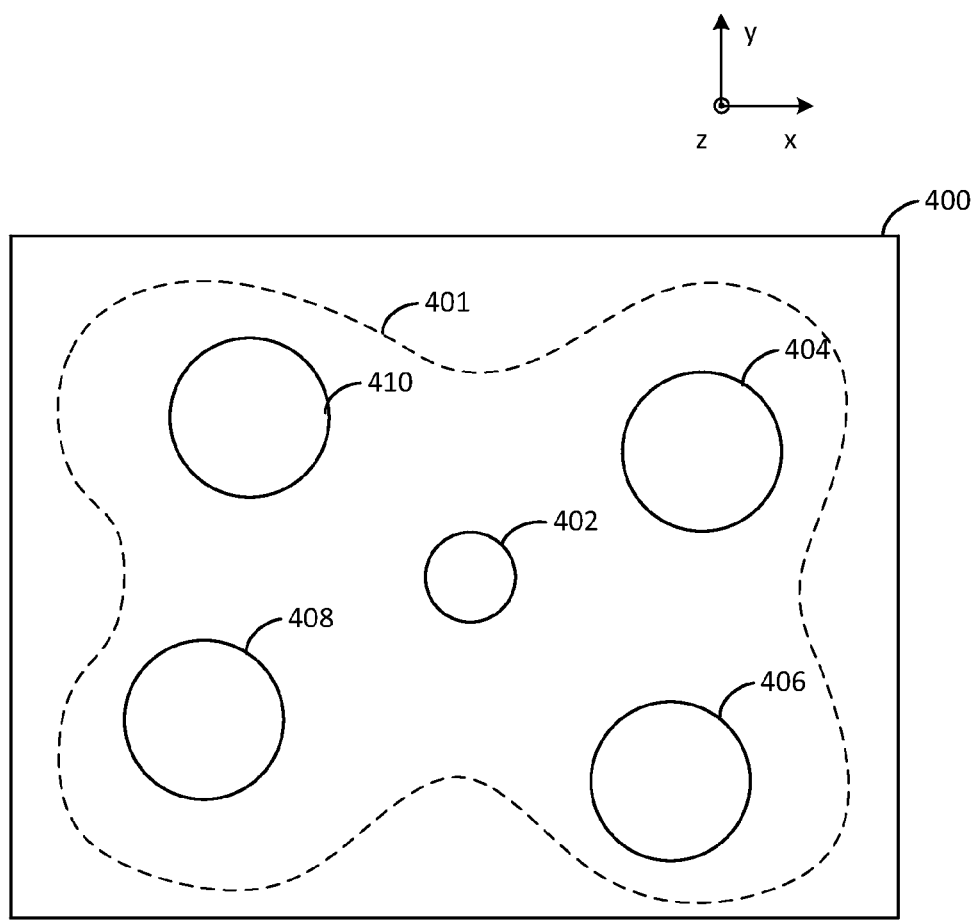
FIG. 4 is a topographic view of a head media interface (HMI), in accordance with various embodiments.

The topography of a head media interface 400 of a thermally actuated magnetic recording head is shown in FIG. 4 from the perspective of looking up from the surface of the medium. In this particular embodiment, four heater subassemblies are disposed along the x direction and the y direction. The head media interface 400 includes five regions of protrusion. Region 402 corresponds to the location of a write head and/or NFT while regions 404, 406, 408, and 410 correspond to heating subassembly locations. While four heater subassembly protrusion regions are shown, the magnetic recording head could include at least any two of regions 404, 406, 408, and 410. The heater subassemblies may comprise a single heater assembly or pairs of the subassemblies may comprise two heater assemblies (one in a cross track orientation and one in a down track orientation). The protrusion regions 402, 404, 406, 408, and 410 are not isolated and expand into each other as shown, for example, in FIG. 3B.

In some embodiments, the protrusion regions 402, 404, 406, 408, and 410 may have a simple shape, such as a square, rectangular, circular, oval, or other smooth curved shape. In other embodiments, the protrusion regions incorporate one or more regions such that an irregular shape, such as a shape having complex curvature, is formed. Thus, the protrusion regions 402, 404, 406, 408, and 410 need not be circular as shown. In further embodiments, two or more of the heater subassembly protrusion regions 404, 406, 408, 410 may be defined by respective contoured regions of the head media interface having protrusions of substantially equal magnitude. The magnitude of protrusion is controlled by the power supplied to the heater subassemblies.

The protrusion regions 402, 404, 406, 408, and 410 are superimposed to form a total protrusion region 401. The total protrusion region 401 can be considered a region of HMI extending outwardly from a location of maximum protrusion to locations that expand by at least a predetermined percentage of maximum HMI protrusion. In some embodiments, the total protrusion region 401 is defined by a region of HMI that protrudes at least 70% relative to a region of maximum protrusion of HMI 400. In other embodiments, the total protrusion region is defined by a region of HMI 400 that protrudes at least 80% relative to a region of maximum protrusion of HMI 400. In other embodiments, the total protrusion region is defined by a region of HMI 400 that protrudes at least 90% relative to a region of maximum protrusion of HMI 400. In other embodiments, the total protrusion region is defined by a region of HMI 400 that protrudes at least 95% relative to a region of maximum protrusion of HMI 400.

Figure 5:
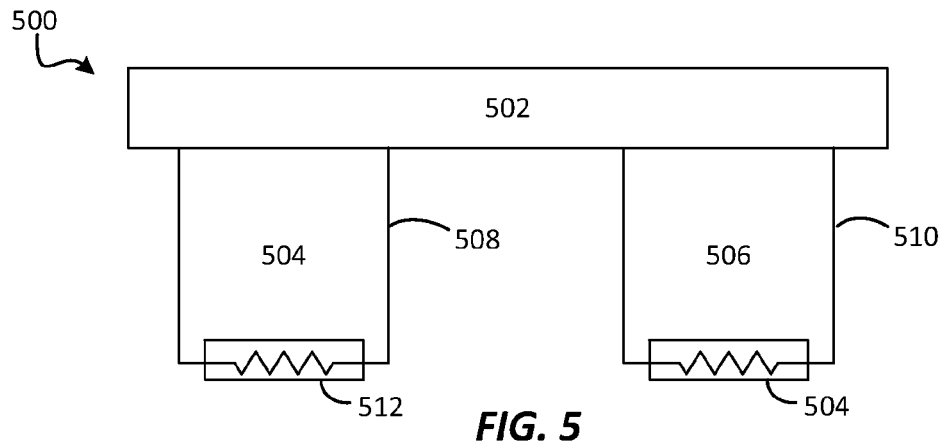
FIG. 5 is circuit diagram of separately controllable heater subassemblies, in accordance with various embodiments.

The heater subassemblies can have a variety of electrical connection configurations. In certain embodiments, the heater subassemblies are not interconnected to each other as shown in FIG. 5. Heater assembly 500 includes subassemblies 504, 506, which are energized and controlled by controller/power supply 502. Heater assembly 500 can be a writer heater assembly or a reader heater assembly. In some embodiments, heater subassembly 504 can be a writer heat assembly and heater subassembly 506 can be a reader heater assembly.

A first heater subassembly 504 is coupled to a power source through a first electrical circuit 508 and the second heater subassembly 506 is coupled to a power source through a second electrical circuit 510. In some embodiments, each of the heater subassemblies 504, 506 may be independently controlled. The power to one of the heater subassemblies 504, 506 may be increased or decreased without increasing or decreasing the power to another 506, 504 of the heater subassemblies. Heater subassemblies 504, 506 can be controlled together or separately via controller/power supply 502.

Figure 6:
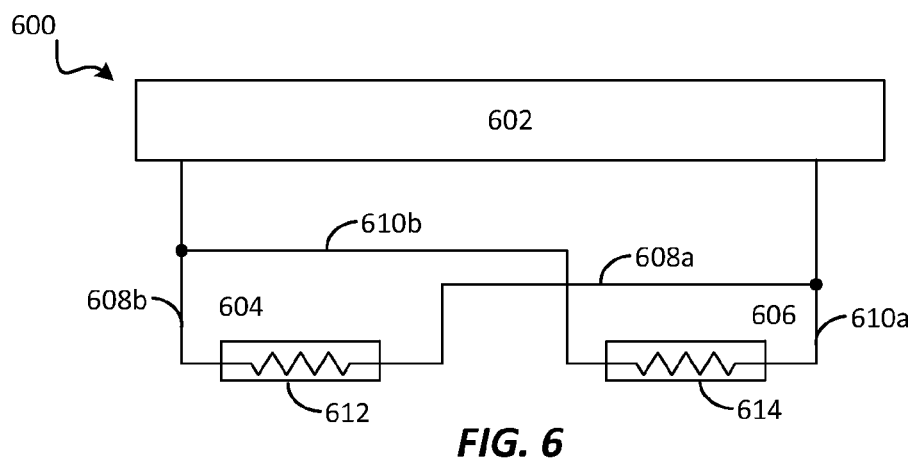
FIG. 6 is circuit diagram of heater subassemblies connected in parallel, in accordance with various embodiments.

In an alternative embodiment shown in FIG. 6, the heater subassemblies 604, 606 are connected in parallel. Heater assembly 600 includes subassemblies 604, 606, which are energized and controlled by controller/power supply 602. Heater assembly 600 can be a writer heater assembly or a reader heater assembly.

A first heater subassembly 604 is coupled to a controller/power supply through first electrical connections 608a, 608b and the second heater subassembly 606 is coupled to a controller/power supply through second electrical connections 610a, 610b. Electrical connections 608a, 610a are connected together and electrical connections 608b, 610b are connected together so that heater subassemblies 604, 608 are electrically connected in parallel.

Figure 7:
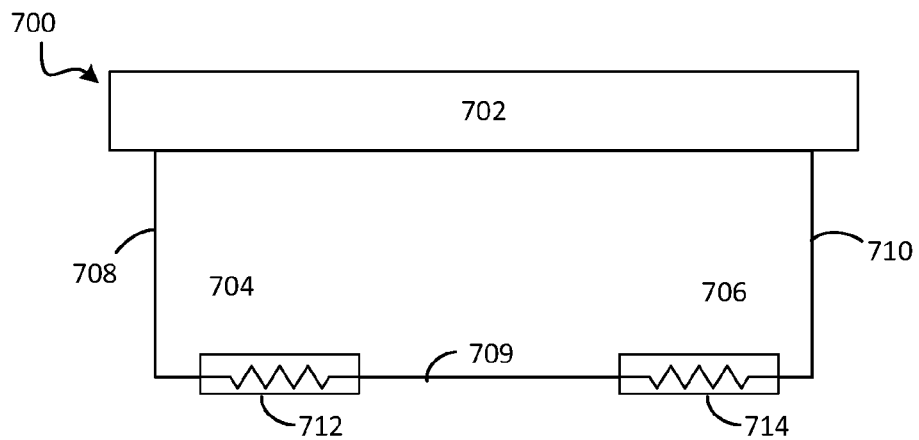
FIG. 7 is circuit diagram of heater subassemblies connected in series, in accordance with various embodiments.

In another alternative embodiment shown in FIG. 7, the heater subassemblies 704, 706 are connected in series. Heater assembly 700 includes subassemblies 704, 706, which are energized and controlled by controller/power supply 702. Heater assembly 700 can be a writer heater assembly or a reader heater assembly. The first heater subassembly 704 is coupled to the second heater subassembly 706 though connection 709 and the series connected subassemblies are connected to the controller/power supply 702 through electrical connections 708 and 710.

Figure 8:
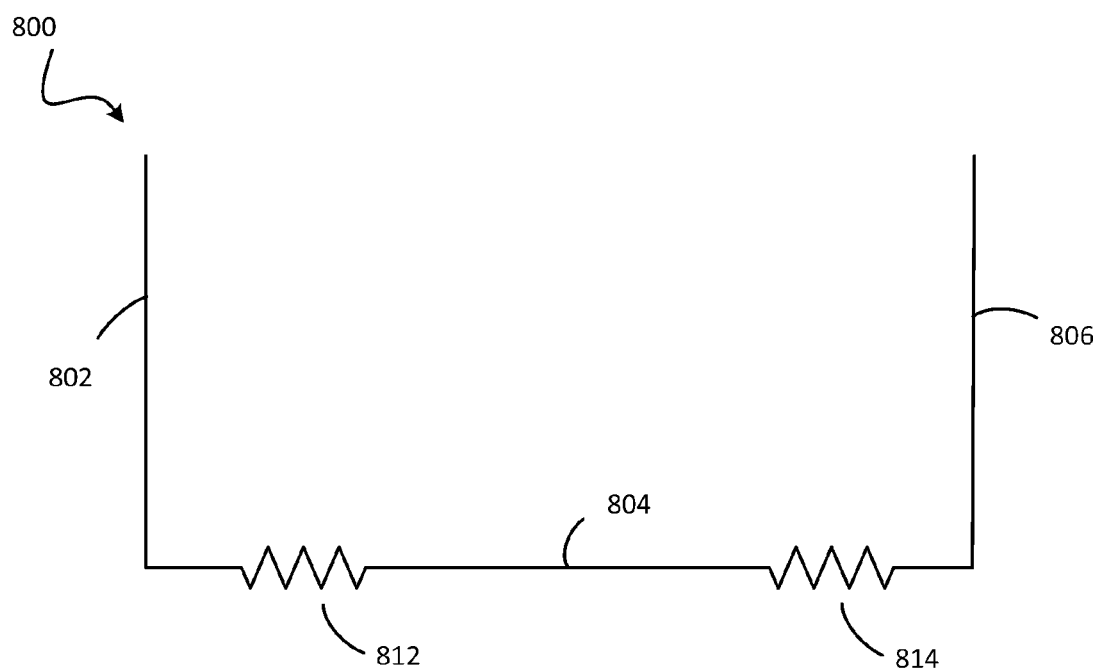
FIG. 8 is a circuit diagram of electrical connections of connected heater subassemblies, in accordance with various embodiments.

With reference to FIG. 8, further discussion of the components of a heater assembly 800 is provided. Heater assembly 800 includes two subassemblies, the first subassembly having a first resistive heating element 812 and a second resistive heating element 814. The resistive heating elements 812, 814 are electrically connected to each other through electrical connections 802, 804, 806. Electrical connections 802, 804, 806 also connect resistive heating elements 812, 814 to one or more controllers/power sources. The first and second resistive heating elements 812, 814 can have the same electrical resistance or the first resistive heating element 812 can have a different electrical resistance than the second resistive heating element 814.

The electrical resistance of resistive heating elements 812, 814 can be imparted by certain materials and/or by trace thickness. In some embodiments, the resistive heating elements 812, 814 may comprise a layer of tungsten having a layer thickness of about 100 nm or a copper layer having a layer thickness of about 30 nm, for example. The resistance the resistive heating elements 812, 814 can be equal or unequal. In certain embodiments, the resistance of the resistive heating elements 812, 814 is greater than the resistance of the connections 802, 804, 806. For example, a ratio between a resistance of a heating element 812 or 814 and a resistance of the electrical connections is greater than about 5 to 25. The resistance of at least one of the heating elements 812, 814 is in range of about 10-70 ohms.

Figure 9:
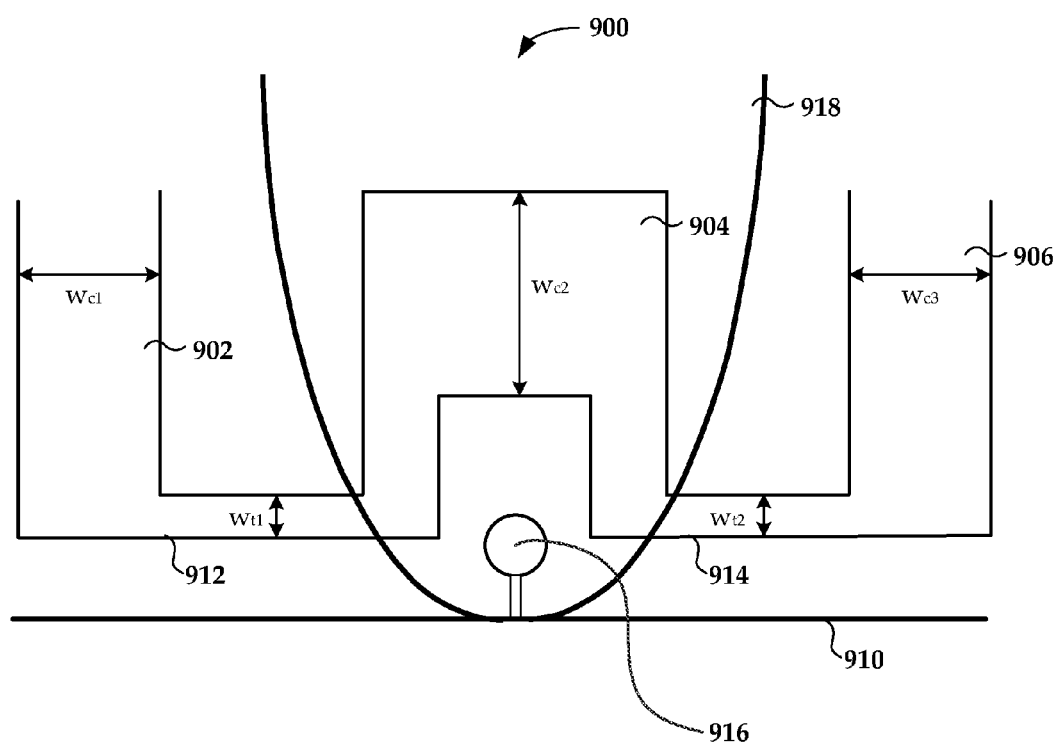
FIG. 9 is a cross-section view of a heater assembly in a magnetic recording head, in accordance with various embodiments.

FIG. 9 illustrates an example geometry of a heater assembly 900 in relation to some of the other components of a magnetic recording head having a head-media interface surface 910. Heater assembly 900 includes two heater subassemblies, the first heater subassembly including a first resistive heating element 912 and a second resistive heating element 914. The resistive heating elements 912, 914 are electrically connected to each other in series and to a controller/power supply through electrical connections 902, 904, 906.

As can be seen from FIG. 9, the trace widths $w_{r1}$, $w_{r2}$ of the resistive heating elements 912, 914 differ from the trace widths $w_{c1}$, $w_{c2}$, $w_{c3}$ of the electrical connections 902, 904, 906. More specifically, the widths of the resistive heating elements 912, 914 are generally smaller than the widths of the electrical connections 902, 904, 906. For example, a ratio between a trace width of a heating element 912 or 914 and a trace width of the electrical connections is less than about 0.1 to 20. The trace width of at least one of the heating elements 912, 914 is in range of about 1 to 20 um.

Like the rest of the magnetic recording head, the heater assembly 900 is produced by depositing layers on a substrate. This allows for differing materials to be used in the production of the heater assembly 900. For example, the material of at least one of the heating elements 912, 914 can differ from the material of the electrical connections 902, 904, 906. In some embodiments, the trace width of at least one of the heating elements 912, 914 is the same as that of the electrical connections 902, 904, 906 and the material of the heating elements differ from the material of the electrical connections 902, 902, 906. In some embodiments, the resistivity of the material of at least one of the heating elements 912, 914 is in range of about $0.02 \times 10^6$ Ωm to $0.1 \times 10^6$ Ωm. A ratio between the resistivity of a heating element 912 or 914 and the material of the electrical connections is less than about 1 to 25. As discussed above, resistive heating elements 912, 914 lie on either side of the magnetic writer that includes a waveguide 918 configured as a solid immersion mirror (SIM) and optical antenna 916. For example, the distance between a heating element 912, 914 and the magnetic writer (at the location of NFT 916) in the cross track direction may be less than about 60 μm and greater than about 4 μm. While the heater assembly 900 is shown with rectangular geometries, other heater assembly shapes are also possible.

Figure 10A:
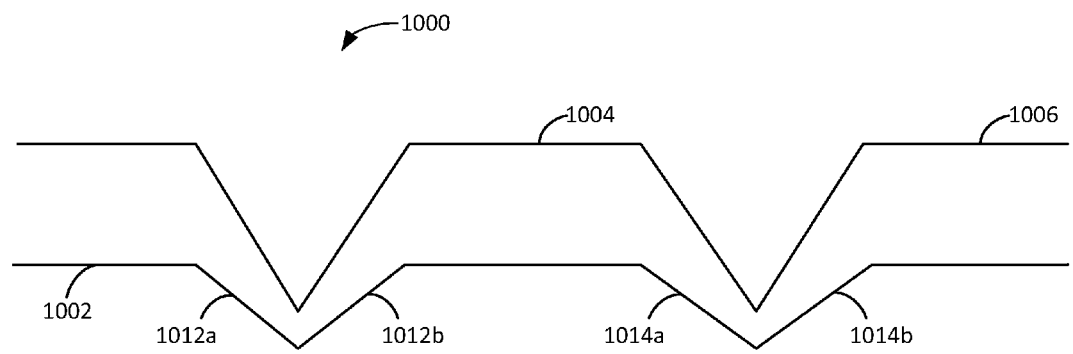
FIGS. 10A-B are alternative geometries of a heater assembly, in accordance with various embodiments.
Figure 10B:
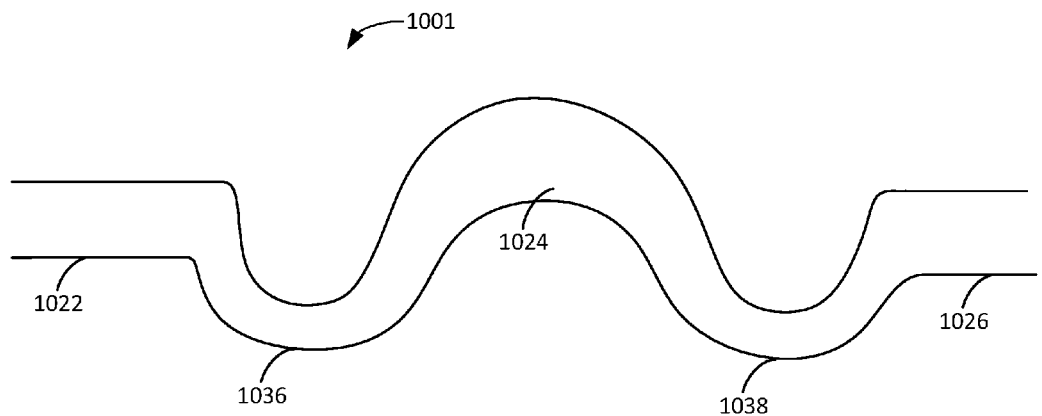

FIGS. 10A-B illustrate alternative heater assembly geometries. In FIG. 10A, heater assembly 1000 includes electrical connections 1002, 1004, 1006 for resistive heating elements 1012 and 1014. Instead of rectangular heating elements, heating elements 1012, 1014 have triangular shapes resulting in respective first and second heating subelements 1012a, 1014a, and 1012b, 1014b, respectively. Similar to the rectangular geometry of FIG. 9, the trace widths of heating elements 1012, 1014 are smaller than those of the electrical connections 1002, 1004, 1006 and the heating elements 1012, 1014 have a higher resistance than the electrical connections 1002, 1004, 1006. While the heating elements are shown coming to a sharp point, the apex of the heating elements 1012, 1014 can be broader.

FIG. 10B illustrates an alternative geometry for the heater subassemblies. Here, resistive heating elements 1036, 1038 and electrical connections 1024 are curved. Again, trace widths and/or materials can be selected for each of the heater assembly components to achieve specified resistivity for the heating elements 1036, 1038 and/or interconnections 1022, 1024, 1026. In addition to the geometries shown, any geometry that provides for a heating element to be located on each of two opposing sides of a write head can be used.

Figure 11:
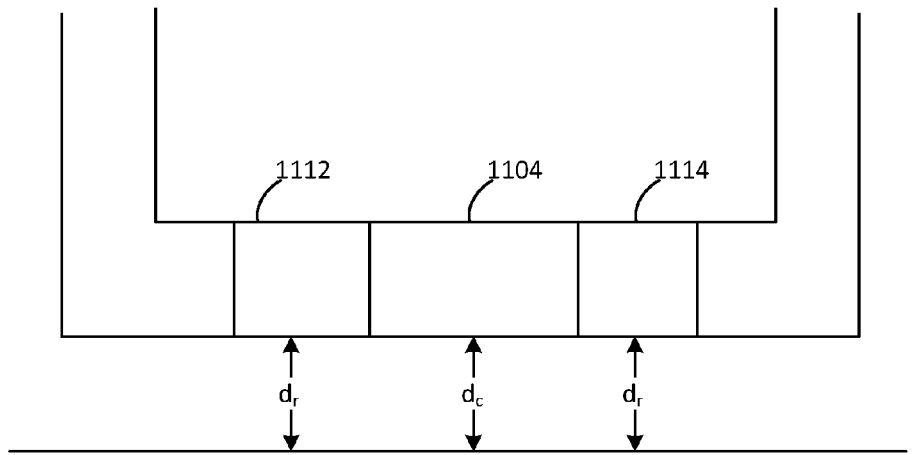
FIGS. 11-12 are schematic views of heater subassemblies relative to a media facing surface, in accordance with various embodiments.
Figure 12:
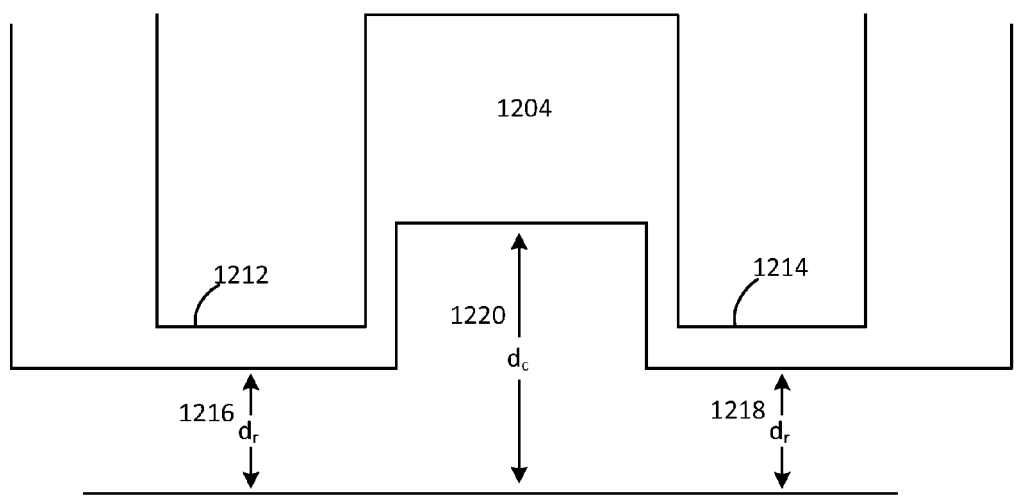

While the heating elements straddle the write head, the distance the heating elements are located from the head media interface can also be configured to cause a desired amount of thermal protrusion. FIGS. 11-12 shows examples of such distances. In one or more embodiments, the resistance of the heating elements 1112, 1114 is different from the resistance of the electrical connection 1104 between the heating elements due to the higher resistivity material used for the heating elements 1112, 1114. In this embodiment, the distance between the heating elements 1112, 1114 and the media facing surface, $d_r$, may be equal to the distance between the electrical connection 1104 and the media facing surface, $d_c$ as shown in FIG. 11. Although both heating elements 1112, 1114 are shown having the same distance $d_r$ as $d_c$, one of the element's distances could differ depending on the resistance of the heating element. The trace widths of the resistive heating elements 1112, 1114 may be between about 1 μm to about 20 μm. Suitable materials for the resistive heating elements 1112, 1114 include tungsten, copper or other materials having electrical resistance between about 20Ω to 100 Ω.

In an alternative embodiment shown in FIG. 12, the distances of heating elements 1212, 1214, $d_r$, both differ from the distance $d_c$ of electrical connection 1204. This occurs when the resistance of the electrical connection differs from that of the heating elements 1212, 1214. For example, in FIG. 12, $d_c > d_r$. Again, this relationship depends upon the resistivity of the materials comprising the respective heating elements 1212, 1214 and the electrical connections, e.g., 1204. The trace widths of the resistive heating elements 1212, 1214 may be between about 1 μm to about 20 μm. Suitable materials for the resistive heating elements 1112, 1114 include tungsten, copper or other materials having electrical resistance between about 20Ω to 100Ω.

Regardless of the respective distances from the heating elements and electrical connections to the media facing surface, that distance is occupied by respective connecting materials 1216, 1218 thermally coupled to the respective heating elements 1212, 1214. The heating element 1212, 1214 and its respective connecting material are components of the heater subassembly. The connecting materials 1216, 1218 can be the same materials or different materials. The connecting material of the heater is selected based on the thermal conductivity required for the respective heater assembly components. For example, one of the connecting materials 1216, 1218 can have a thermal conductivity between about 20 W/° Km to 400 W/° Km.

A third connecting material 1220 can thermally couple electrical connection 1204 with the media facing surface. The third connecting material 1220 can be a different material from at least one of the other connecting materials 1216, 1218. However, in some implementations, the connecting material 1220 may have a thermal conductivity of up to about 50 W/° Km. The thermal conductivity of the third connecting material 1220 can be selected based on the thermal conductivity of the other connecting materials 1216, 1218. For example, the thermal conductivity of the third connecting material 1220 can be at least ten times less than the thermal conductivity of at least one of the other connecting materials

1216, 1218. As previously discussed, the resistive heating elements 1212, 1214 may have electrical resistance between about 20Ω to 100Ω.

Figure 13:
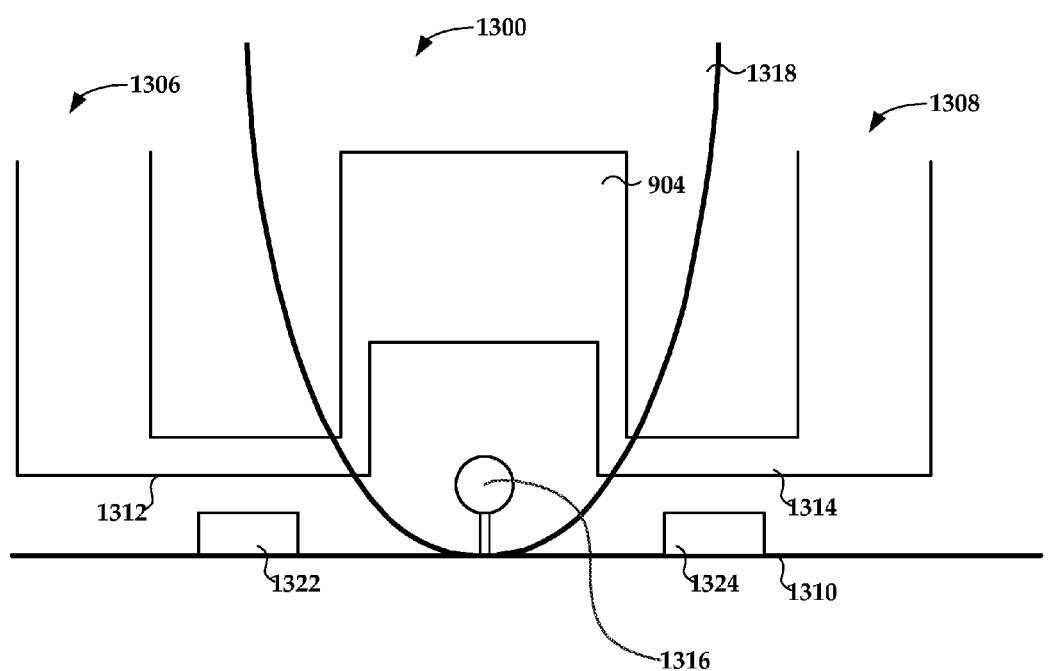
FIG. 13 is a cross-section view of a heater assembly in a magnetic recording head, in accordance with various embodiments.

In addition to the connecting material, additional structures can be added between the heater subassemblies and the media facing surface of the magnetic recording head having a head media interface 1310 as shown in FIG. 13. Similar to FIG. 9, a heater assembly 1300 is shown having heater subassemblies 1306, 1308 on either side of a write head that includes a SIM 1318 and NFT optical antenna 1316. In this example, the heater subassemblies 1306, 1308 include thermal expansion pads 1322, 1324 which are disposed on each side of NFT 1316. The thermal expansion pads 1322, 1324 are located near hot spots caused by the heater elements 1312, 1314 to enhance protrusion of the HMI 1310 at these locations. Thermal expansion pads 1322, 1324 comprise materials, e.g., metals, that expand by a predetermined amount when heated. The addition of thermal expansion pads 1322, 1324 further increases the contact surface of the protrusion. This increased contact surface facilitates reading or writing to the magnetic medium and/or reduces impact to the magnetic recording head from impact with the media.

As discussed above, the heater subassemblies, when actuated, cause thermal expansion of the HMI. The location and configuration of these heater subassemblies, when combined with actuation of the write head and especially an NFT, creates a broad protrusion profile, as shown for example in FIG. 3B. The protrusion profile is a superposition of the thermal expansion contributions of all the heating sources, e.g., NFT, write pole, and heater subassemblies. The protrusion profile is determined by a number of factors such as: 1) material used for the heating subassemblies, e.g., the materials used for the resistive elements, the materials used for the connecting materials and/or materials used for the thermal expansion materials 2) number and 3) arrangement of the heating subassemblies, 4) distance of the heating subassemblies from the media facing surface, 5) trace widths of the resistive heating elements 6) trace widths of the electrical connections 7) amount of protrusion cause by the write pole and NFT among other factors. These factors can be taken into account into a head design to achieve a deviation (Δdev) in the protrusion profile between the location of the first heater subassembly and the location of the second heater subassembly less than about 20 nm, or less than about 18 nm, or even less than about 15 nm in the protrusion region.

Figure 14:
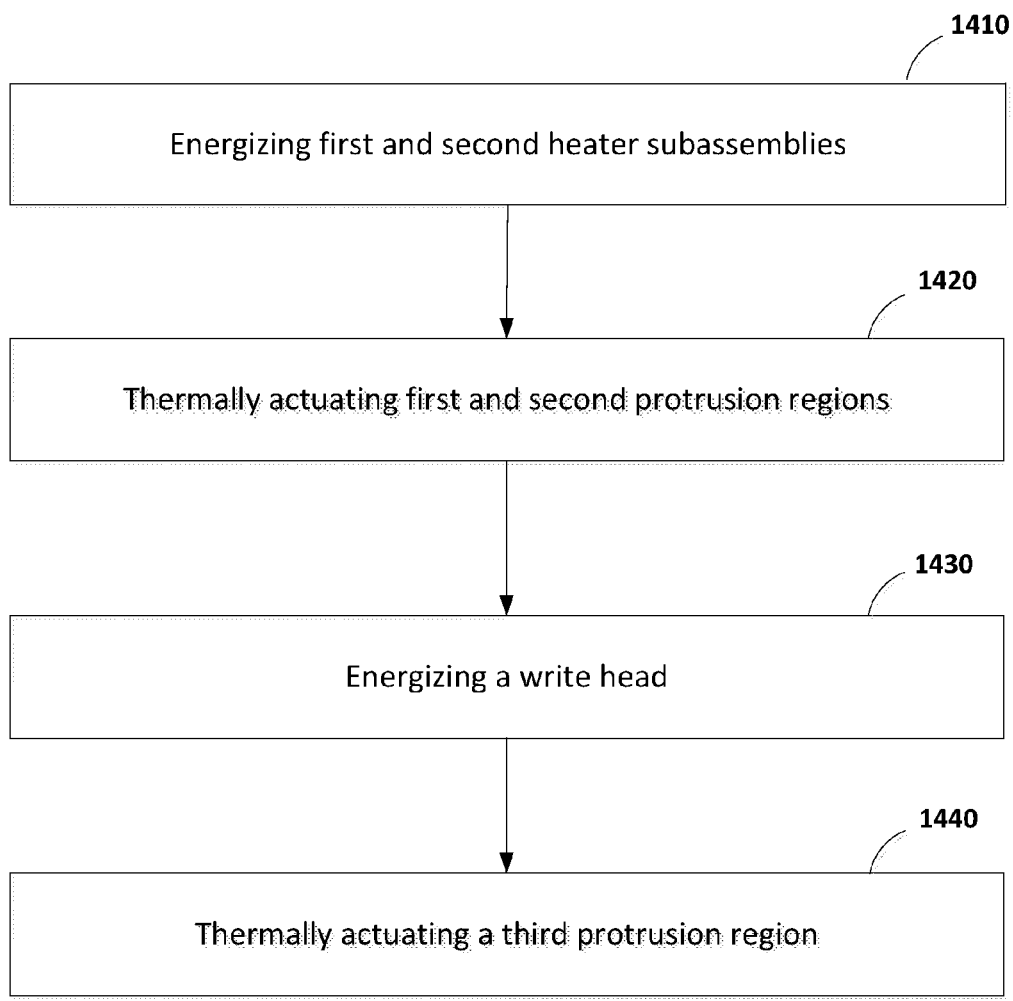
FIG. 14 is a flow chart of a method, in accordance with various embodiments.

With reference to FIG. 14, a method for thermally actuating a head-media interface of a magnetic recording head is described. A first heater subassembly and a second heater subassembly of a magnetic recording head are energized 1410. The first and second heater subassemblies can be independently energized or energized together. For example, the first and second heater subassemblies can be separately controllable, connected in series, or connected in parallel. In response to energizing the first heater subassembly, a first thermal protrusion is created at a first location of the head-media interface of the magnetic recording head. Likewise, in response to energizing the second heater subassembly, a second thermal protrusion is created at a second location of the head-media interface of the magnetic recording head 1420. A write head of the magnetic recording head is also energized 1430. The write head can be energized by energizing a magnetic write pole of the magnetic recording head, energizing a near-field transducer of the write head, or both. In response to energizing the write head, a write head thermal protrusion is created at the head-media interface of the magnetic recording head, wherein a location of the write head thermal protrusion is between the first and second locations 1440.

As illustrated above, the thermal protrusions extend three-dimensionally toward a media surface. Energizing the heater subassemblies and write head can be controlled to control the location and/or shape of the thermal protrusions. This directed protrusion is described using a coordinate space defined by orthogonal x, y, and z axes. The x axis is a down track axis, and the y axis is a cross track axis. The z axis is normal to the head-media interface of a magnetic recording head.

In an embodiment, protrusion is controlled in a down track direction. The first heater subassembly is energized creating a first thermal protrusion at a first protrusion location, $L_{PX1}$, along the x axis. The first thermal protrusion has a first maximum stroke, $S_{Max1}$, measured along the z axis at $L_{PX1}$, where stroke is a measurement of the extent of protrusion from a default state/position of the head media interface when the magnetic recording head is not thermally actuated. The second heater subassembly is energized creating a second thermal protrusion at a second protrusion location, $L_{PX2}$, along the x axis. The second thermal protrusion has a second maximum stroke, $S_{Max2}$, measured along the z axis at $L_{PX2}$. The write head is energized creating the write head thermal protrusion at a third location, $L_{PXW}$, along the x axis. The write head thermal protrusion has a maximum stroke, $S_{MW}$, measured from along the z axis at $L_{PXW}$, where $L_{PXW}$ is between $L_{PX1}$ and $L_{PX2}$ along the x axis. The thermal protrusion stroke of the write head is controlled to vary the maximum stroke created by the write head from the maximum strokes created by the first and second heater subassemblies. For example, the thermal protrusion stroke of the write head is controlled to be less than about 15 nm between $L_{PX1}$ and $L_{PX2}$ along the x axis.

In an alternative embodiment, protrusion is controlled in a cross track direction. The first heater subassembly is energized creating a first thermal protrusion at a first protrusion location, $L_{PY1}$, along the y axis. The first thermal protrusion has a first maximum stroke, $S_{Max1}$, measured along the z axis at $L_{PY1}$. The second heater subassembly is energized creating a second thermal protrusion at a second protrusion location, $L_{PY2}$, along the y axis. The second thermal protrusion has a second maximum stroke, $S_{Max2}$, measured along the z axis at $L_{PY2}$. The write head is energized creating the write head thermal protrusion at a third location, $L_{PYW}$, along the y axis. The write head thermal protrusion has a maximum stroke, $S_{MW}$, measured from along the z axis at $L_{PYW}$, where $L_{PYW}$ is between $L_{PY1}$ and $L_{PY2}$ along the y axis. The thermal protrusion stroke of the write head is controlled to vary the maximum stroke created by the write head from the maximum strokes created by the first and second heater subassemblies. For example, the thermal protrusion stroke of the write head is controlled to be less than 15 nm between $L_{PY1}$ and $L_{PY2}$ along the y axis.

As described herein, the extent and/or location of protrusion can be controlled through thermal actuation of the magnetic recording head. To direct the location of protrusion, any combination of elements can be actuated including a write coil, an NFT, and one or more heater subassemblies. The extent of protrusion is controlled by the amount of power supplied to thermal actuating elements. However, primary control is exerted through the amount of power supplied to the one or more heater subassemblies since the amount of heat generated by a write coil and NFT are substantially constant.

For example, in a frame of reference including a down track x axis and an orthogonal cross track y axis, in some implementations, the first heater subassembly is disposed at a first position along the x axis and the second heater subassembly is disposed at a second position along the x axis, different from the first position. When energized, the first heater subassembly is configured to cause a first thermal protrusion having a first maximum stroke displacement along a z axis normal to a head media interface. The first maximum stroke displacement occurs at a first protrusion location along the x axis. When energized, the second heater subassembly is configured to cause a second thermal protrusion having a second maximum stroke displacement along the z axis occurring at a second protrusion location along the x axis. The first thermal protrusion location is different from the second thermal protrusion location along the x axis.

For example, in a frame of reference including a down track x axis and an orthogonal cross track y axis, the first heater subassembly is disposed at a first position along the y axis and the second heater subassembly is disposed at a second position along the y axis, different from the first position. When energized, the first heater subassembly is configured to cause a first thermal protrusion having a first maximum stroke displacement along a z axis normal to a head media interface. The first maximum stroke displacement occurs at a first protrusion location along the y axis. When energized, the second heater subassembly is configured to cause a second thermal protrusion having a second maximum stroke displacement along the z axis. The second maximum stroke displacement occurs at a second protrusion location along the y axis. The first thermal protrusion location is different from the second thermal protrusion location along the y axis.

According to some aspects, the first heater subassembly is coupled to a power source through a first electrical circuit and the second heater subassembly is coupled to a power source through a second electrical circuit. The first heater subassembly may be separately controllable from the second heater subassembly.

In some configurations, the first heater subassembly comprises a first resistive heating element and the second heater subassembly comprises a second resistive heating element. The write heater assembly comprises one or more electrical connections coupled to at least one of the first heater subassembly and the second heater subassembly. For example, the electrical connections electrically connect the first resistive heating element and the second resistive heating element in series or in parallel. The first and second resistive heating elements may have the same resistance, or the resistance of the first resistive heating element may be different from the resistance of the second resistive heating element.

The material of the first heating element may be the same as or different from the material of the second heating element. The material of the heating elements can be different from the material of the one or more electrical connections.

A trace width of at least one of the first and second resistive heating elements may be different from a trace width of the electrical connections. For example, a trace width of the first and/or second heating elements may be in a range of about 1 μm to about 20 μm.

In some configurations a ratio between a trace width of at least one of the first and second resistive heating elements and a trace width of at least one of the electrical connections is less than about 0.1 to 20. For example, the resistance of at least one of the first and second resistive heating elements may be in a range of about 10Ω to about 70Ω. The ratio between the resistance of at least one of the first and second resistive heating elements and the resistance of at least one of the electrical connections can be greater than about 5 to 25.

In some implementations, resistivity of the material of at least one of the first and second resistive heating elements is in a range of about $0.02 \times 10^{-6}$ Ω-m to about $0.1 \times 10^{-6}$ Ω-m. The ratio between the resistivity of at least one of the first and second resistive heating elements and the material of at least one of the electrical connection is less than about 1 to 25.

According to some aspects, at least one of the first and second resistive heating elements is positioned at a distance $d_r$ from a media facing surface of the magnetic recording head and a nearest portion of the one or more electrical connections (e.g., a portion joining the first and second resistive heating elements) is positioned at a distance $d_c$ from the media facing surface and $d_r \neq d_c$.

According to some aspects at least one of the first and second resistive heating elements is positioned at a distance $d_r$ from a media facing surface of the magnetic recording head and a nearest portion of the one or more electrical connections (e.g., a portion joining the first and second resistive heating elements) is positioned at a distance $d_c$ from the media facing surface and $d_r = d_c$ or $d_r < d_c$.

The first heater subassembly can include a first resistive heating element and a first connecting material thermally coupled to the first resistive heating element, at least a portion of the first connecting material disposed between the first resistive heating element and a media facing surface of the magnetic recording head. The second heater subassembly can include a second resistive heating element and a second connecting material thermally coupled to the second resistive heating element, at least a portion of the second connecting material disposed between the second resistive heating element and the media facing surface of the magnetic recording head. The first connecting material may be the same as the second connecting material or the first connecting material may be the same as the second connecting material. For example, the first and second connecting material may have a thermal conductivity in a range of about 20 W/° Km to 400 W/° Km, e.g., about 50 W/° Km.

According to some implementations, a third connecting material may be thermally coupled to at least one electrical connection that electrically couples the first and second heating elements. The third connecting material is different from at least one of the first and second connecting material and may have a thermal conductivity in a range of about 20 W/° Km to 400 W/° Km, e.g., about 50 W/° Km. For example, the third connecting material may have a thermal conductivity that is at least 10 times less than at least one of the first and second connecting materials.

In some implementations, the first heater subassembly and the second heater subassembly are disposed between the return write pole and the main write pole of the magnetic recording head. In some implementations, the magnetic recording head includes a read sensor and the first heater subassembly and the second heater subassembly are disposed between the return write pole and the read sensor. In some cases, the first heater subassembly is positioned proximate to the read sensor and the second heater subassembly is positioned proximate to the magnetic writer Some embodiments involve a magnetic recording head that includes a magnetic write head. The magnetic write head comprises a main write pole, a return write pole, and a near field transducer. The magnetic recording head includes a writer heater assembly comprising at least one first heater subassembly and at least one second heater subassembly. The near field transducer is disposed between the first heater subassembly and the second heater subassembly.

For example, consider a coordinate space defined by orthogonal x, y, z axes, where the x axis is a down track axis, the y axis is a cross track axis, and the z axis is normal to a head media interface of the magnetic recording head.

In some implementations, when energized, the first heater subassembly is configured to cause a first thermal protrusion at a first protrusion location, $L_{PX1}$, along the x axis, the first thermal protrusion having a first maximum stroke, $S_{Max1}$, measured along the z axis at $L_{PX1}$. When energized, the second heater subassembly is configured to cause a second thermal protrusion at a second protrusion location, $L_{PX2}$, along the x axis, the second thermal protrusion having a second maximum stroke, $S_{Max2}$, measured along the z axis at $L_{PX2}$. The magnetic write head causes a write head thermal protrusion at a protrusion location, $L_{PXW}$, along the x axis. The write head thermal protrusion has a maximum stroke, $S_{MW}$, measured from along the z axis at $L_{PXW}$, where $L_{PXW}$ is between $L_{PX1}$ and $L_{PX2}$ along the x axis.

In some implementations, when energized, the first heater subassembly is configured to cause a first thermal protrusion at a first protrusion location, $L_{PY1}$, along the y axis, the first thermal protrusion having a first maximum protrusion stroke, $S_{Max1}$, measured along the z axis at $L_{PY1}$. When energized, the second heater subassembly is configured to cause a second thermal protrusion at a second protrusion location, $L_{PY2}$, along the y axis, the second thermal protrusion having a second maximum protrusion stroke, $S_{Max2}$, measured along the z axis at $L_{PY2}$. The magnetic write head causes a write head thermal protrusion at a protrusion location, $L_{PYW}$, along the y axis, the write head thermal protrusion having a maximum protrusion stroke, $S_{MW}$, measured from along the z axis at $L_{PYW}$, where $L_{PYW}$ is between $L_{PY1}$ and $L_{PY2}$ along the y axis.

A protrusion profile the magnetic recording head is a superposition of the protrusion profile contribution of the first thermal protrusion, the protrusion profile contribution of the second thermal protrusion, and the protrusion profile contribution of the write head thermal protrusion. For example, in a particular implementation, the stroke of the magnetic recording head may vary less than about 20 nm between $L_{PX1}$ and $L_{PX2}$ along the x axis and less than 18 nm between $L_{PY1}$ and $L_{PY2}$ along the y axis.

Some embodiments involve a method of providing a thermal protrusion of a magnetic recording head. At least a first heater subassembly and a second heater subassembly of a magnetic recording head are energized. The energizing of the first heater subassembly creates a first thermal protrusion at a first location of a head-media interface of the magnetic recording head. The energizing of the second heater subassembly creates a second protrusion at a second location of the head media interface of the magnetic recording head. A write head of the magnetic recording head is energized. The energizing of the write head creates a write head thermal protrusion at the head media interface of the magnetic recording head. A location of the write head thermal protrusion is between the first location and the second location. For example, energizing the write head comprises energizing a magnetic write pole of the magnetic recording head and/or energizing a near field transducer of the write head.

According to some various scenarios, energizing the first heater subassembly and the second heater subassembly involves independently energizing the first heater subassembly and the second heater subassembly. In some cases, the first and second heater assemblies are energized concurrently and/or non-independently.

Consider a coordinate space defined by orthogonal x, y, z axes, where the x axis is a down track axis, the y axis is a cross track axis, and the z axis is normal to a head media interface of the magnetic recording head.

In some implementations, energizing the first heater subassembly comprises creating the first thermal protrusion at a first protrusion location, $L_{PX1}$, along the x axis, the first thermal protrusion having a first maximum stroke, $S_{Max1}$, measured along the z axis at $L_{PX1}$. Energizing the second heater subassembly comprises creating the second thermal protrusion at a second protrusion location, $L_{PX2}$, along the x axis, the second thermal protrusion having a second maximum stroke, $S_{Max2}$, measured along the z axis at $L_{PX2}$. Energizing the magnetic write head comprises creating the write head thermal protrusion at a protrusion location, $L_{PXW}$, along the x axis, the write head thermal protrusion having a maximum stroke, $S_{MW}$, measured from along the z axis at $l_{PXW}$, where $L_{PXW}$ is between $L_{PX1}$ and $L_{PX2}$ along the x axis and the variation in the thermal protrusion stroke of the write head is less than about 20 nm, less than about 18 nm, less than about 15 nm or even less than about 10 nm between $L_{PX1}$ and $L_{PX2}$ along the x axis.

In some implementations, energizing the first heater subassembly comprises creating the first thermal protrusion at a first protrusion location, $L_{PY1}$, along the y axis, the first thermal protrusion having a first maximum stroke, $S_{Max1}$, measured along the z axis at $L_{PY1}$. Energizing the second heater subassembly comprises creating the second thermal protrusion at a second protrusion location, $L_{PY2}$, along the y axis, the second thermal protrusion having a second maximum stroke, $S_{Max2}$, measured along the z axis at $L_{PY2}$. Energizing the magnetic write head comprises creating the write head thermal protrusion at a protrusion location, $L_{PYW}$, along the y axis, the write head thermal protrusion having a maximum stroke, $S_{MW}$, measured from along the z axis at $L_{PYW}$, where $L_{PW}$ is between $L_{PY1}$ and $L_{PY2}$ along the y axis and the variation in the overall thermal protrusion stroke of the write head is less than about 20 nm, less than about 18 nm, less than about 15 nm or even less than about 10 nm between $L_{PY1}$ and $L_{PY2}$ along the y axis.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A magnetic recording head, comprising:
   a magnetic write head including a near field transducer, a main write pole and a return write pole; and
   a write heater assembly comprising at least one first heater subassembly, at least one second heater subassembly, and at least one electrical connection configured to electrically connect a first resistive heating element of the first heater subassembly and a second resistive heating element of the second heater subassembly in series, wherein at least part of the near field transducer is disposed between the first heater subassembly and the second heater subassembly.

2. The magnetic recording head of claim 1, wherein, in a frame of reference including a down track x axis and an orthogonal cross track y axis, the first heater subassembly is disposed at a first position along the x axis and the second heater subassembly is disposed at a second position along the x axis, different from the first position.

3. The magnetic recording head of claim 2, wherein a variation in a protrusion profile of a head media interface of the magnetic recording head between the first heater subassembly and the second heater subassembly varies by less than about 20 nm when the first heater subassembly, the second heater subassembly and the magnetic write head are energized.

4. The magnetic recording head of claim 1, wherein, in a frame of reference including a down track x axis and an orthogonal cross track y axis, when energized, the first heater subassembly is configured to cause a first thermal protrusion having a first maximum stroke displacement along a z axis normal to a head media interface, the first maximum stroke displacement occurring at a first protrusion location along the x axis and the second heater subassembly is configured to cause a second thermal protrusion having a second maximum stroke displacement along the z axis occurring at a second protrusion location along the x axis, wherein the first thermal protrusion location is different from the second thermal protrusion location along the x axis.

5. The magnetic recording head of claim 1, wherein, in a frame of reference including a down track x axis and an orthogonal cross track y axis, the first heater subassembly is disposed at a first position along the y axis and the second heater subassembly is disposed at a second position along the y axis, different from the first position.

6. The magnetic recording head of claim 5, wherein a variation in a protrusion profile of a head media interface of the magnetic recording head between the first heater subassembly and the second heater subassembly varies by less than about 20 nm when the first heater subassembly, the second heater subassembly and the magnetic write pole are energized.

7. The magnetic recording head of claim 1, wherein, in a frame of reference including a down track x axis and an orthogonal cross track y axis, when energized, the first heater subassembly is configured to cause a first thermal protrusion having a first maximum stroke displacement along a z axis normal to a head media interface, the first maximum stroke displacement occurring at a first protrusion location along the y axis and the second heater subassembly is configured to cause a second thermal protrusion having a second maximum stroke displacement along the z axis occurring at a second protrusion location along the y axis, wherein the first thermal protrusion location is different from the second thermal protrusion location along the y axis.

8. The magnetic recording head of claim 1, wherein a trace width of at least one of the first and second resistive heating elements is different from a trace width of the electrical connection.

9. The magnetic recording head of claim 1, wherein a trace width of at least one of the first and second resistive heating elements is in a range of about 1 µm to about 20 µm.

10. The magnetic recording head of claim 1, wherein a ratio between a trace width of at least one of the first and second resistive heating elements and a trace width of the electrical connection is between about 0.1 and 20.

11. The magnetic recording head of claim 1, wherein a resistance of at least one of the first and second resistive heating elements is in a range of about 10Ω to about 70Ω.

12. The magnetic recording head of claim 1, wherein a ratio between a resistance of at least one of the first and second resistive heating elements and a resistance of the electrical connection is between about 5 and 25.

13. The magnetic recording head of claim 1, wherein a trace width of the first and second resistive heating elements is the same as a trace width of the electrical connection and a distance between the first or second resistive heating elements and a head media interface is less than a distance between the electrical connection and the head media interface.

14. The magnetic recording head of claim 8, wherein the first and second resistive heating elements are positioned at a distance $d_r$ from a head media interface of the magnetic recording head and the electrical connection is positioned at a distance $d_c$ from the media facing surface and $d_r = d_c$.

15. The magnetic recording head of claim 1, wherein at least one of the first heater subassembly and the second heater subassembly are positioned between the main write pole and the return write pole.

16. The magnetic recording head of claim 1, further comprising:
a read sensor, wherein the first heater subassembly is positioned proximate the read sensor and the second heater subassembly is positioned proximate the magnetic write head.

17. A magnetic recording head, comprising:
a magnetic write head comprising a main write pole and a near field transducer; and
a write heater assembly comprising at least one first heater subassembly, at least one second heater subassembly, and at least one electrical connection configured to electrically connect a first resistive heating element of the first heater subassembly and a second resistive heating element of the second heater subassembly in series, wherein the near field transducer is disposed between the first heater subassembly and the second heater subassembly.

18. A method, comprising:
energizing at least a first heater subassembly and a second heater subassembly of a magnetic recording head, the first heater subassembly comprises a first resistive heating element and the second heater subassembly comprises a second resistive heating element and at least one electrical connection is configured to electrically connect the first resistive heating element and the second resistive heating element in series, the energizing of the first heater subassembly creating a first thermal protrusion at a first location of a head-media interface of the magnetic recording head and the energizing of the second heater subassembly creating a second protrusion at a second location of the head media interface of the magnetic recording head;
energizing a write head of the magnetic recording head, the energizing of the write head creating a near field transducer thermal protrusion at the head media interface of the magnetic recording head, wherein a location of the near field transducer thermal protrusion is between the a first location and the second location.

19. The method of claim 18, wherein energizing the write head comprises energizing at least one of a magnetic write pole and a near field transducer of the magnetic recording head.

* * * * *